United States Patent [19]

Thonney

[11] Patent Number: 4,615,147
[45] Date of Patent: Oct. 7, 1986

[54] MACHINE FOR TUMBLING, DEBURRING AND/OR POLISHING BULK PRODUCTS

[76] Inventor: Michel Thonney, Grenade 36, 1510 Moudon, Switzerland

[21] Appl. No.: 694,390

[22] Filed: Dec. 18, 1984

[30] Foreign Application Priority Data

May 4, 1983 [CH] Switzerland ............... 2417/83

[51] Int. Cl.$^4$ ............................................. B24B 31/04
[52] U.S. Cl. ................................................. 51/164.1
[58] Field of Search ............... 51/164.1, 164.2, 163 R, 51/7

[56] References Cited

U.S. PATENT DOCUMENTS

| 1,508,345 | 9/1924 | Lupo . | |
|---|---|---|---|
| 1,806,194 | 5/1931 | Ensslin | 51/164.1 |
| 2,058,257 | 10/1936 | Porteous | 51/164.1 |
| 2,370,792 | 3/1945 | Hoffman | 51/164.1 |
| 3,823,512 | 7/1974 | Kobayashi | 51/164.2 |
| 3,855,740 | 12/1974 | Kobayashi | 51/164.2 |
| 4,232,486 | 11/1980 | Rampe . | |

FOREIGN PATENT DOCUMENTS

| 1906623 | 10/1969 | Fed. Rep. of Germany . |
| 2129638 | 10/1972 | France . |
| 2172736 | 9/1973 | France . |
| 2447247 | 8/1980 | France . |

Primary Examiner—Harold D. Whitehead
Attorney, Agent, or Firm—Hayes, Davis & Soloway

[57] ABSTRACT

The machine described comprises a rotary drum (13) provided with an opening (23) blocked by a door (24). Said door comprises locking means and the machine is equipped with an automatic locking-unlocking device (26) to automatically lock the door (24) on the drum (13) or to unlock and raise it to clear the opening (23) of the drum. This machine further comprises means (17) for loading the drum and mechanical drive means for the drum (13).

6 Claims, 5 Drawing Figures

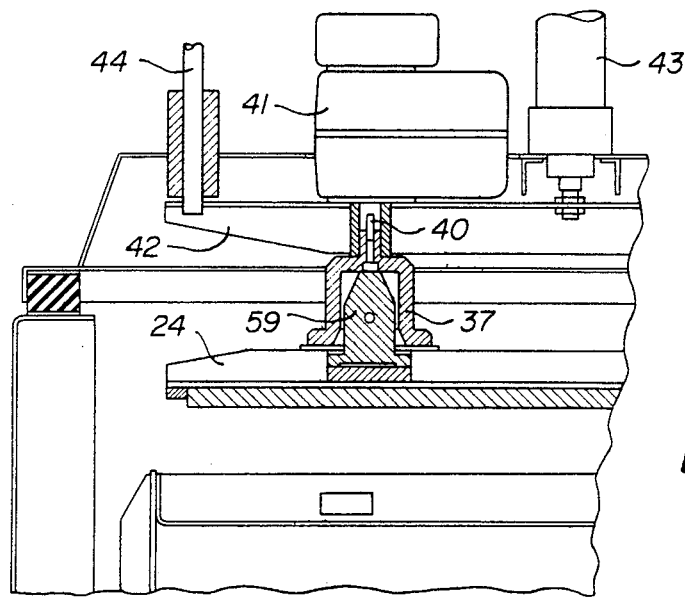
FIG. 3
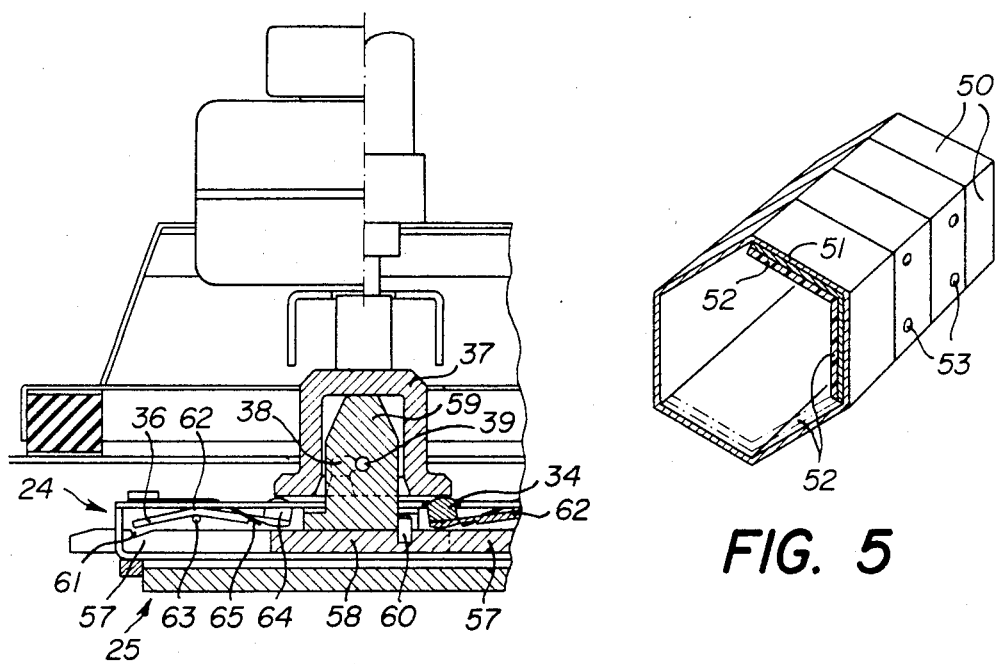
FIG. 4
FIG. 5

MACHINE FOR TUMBLING, DEBURRING AND/OR POLISHING BULK PRODUCTS

The present invention concerns a machine for tumbling, deburring and/or polishing bulk products, particularly unpolished molded or manufactured metal products, said machine comprising a drum rotatable on a horizontal axle, caused to rotate by a drive mechanism, a control means for the drive mechanism, means for loading the products to be treated into the drum, and means for retrieving the products after treatment, in which the drum has a lateral opening, an removable door adapted to said opening and locking means disposed to lock the door in position on the drum opening, and in which the drum has a protective interior covering.

Tumbling apparatus of this type are already known, described in particular in French Patent Application No. 80 04269, U.S. Pat. No. 1,426,435, U.K. Pat. No. 912 647 and Netherlands Patent Application No. 68 10485.

The French Patent Application, which defines the closest prior art, describes a machine having a rotary tumbling drum with a door which locks manually. Furthermore, the drive mechanism provided thereon is of the conventional type, that is, it comprises several buttons for the engagement and disengagement of the drive means, but does not permit programming a complete work cycle for the tumbling apparatus. Finally, the interior covering, consisting of a layer of vulcanized rubber, is made by vulcanizing specialists. This means that, when the covering is worn out, the drum must be dismounted, taken to the specialist, who must then remove the worn covering, then replace it with a new one, which is then submitted to vulcanization treatment. These various procedures are particularly costly, since the machine must remain idle for a considerable length of time.

The present invention proposes to overcome the aforementioned disadvantages and offers several improvements over the machines as above defined.

To this end, the machine according to the invention is characterized by the fact that the control means for the drive mechanism is situated in a casing and comprises means for automatically programming a complete work cycle into the machine, by the fact that it comprises an automatic locking-unlocking device for the door, disposed to act upon the locking means, and by the fact that the interior covering is made of prefabricated plates provided with elements for attaching them to the interior walls of the drum.

The present invention will be better understood with reference to the description of one exemplary embodiment and to the attached drawings, in which:

FIG. 3 is an enlarged partial cross-section of the locking-unlocking device and the means for locking the door on the drum of the machine;

FIG. 4 is another view of the locking-unlocking means and the means for locking the door on the drum of the machine;

FIG. 5 is a perspective, partially in cross-section, illustrating the drum and its interior covering.

Figure 1:
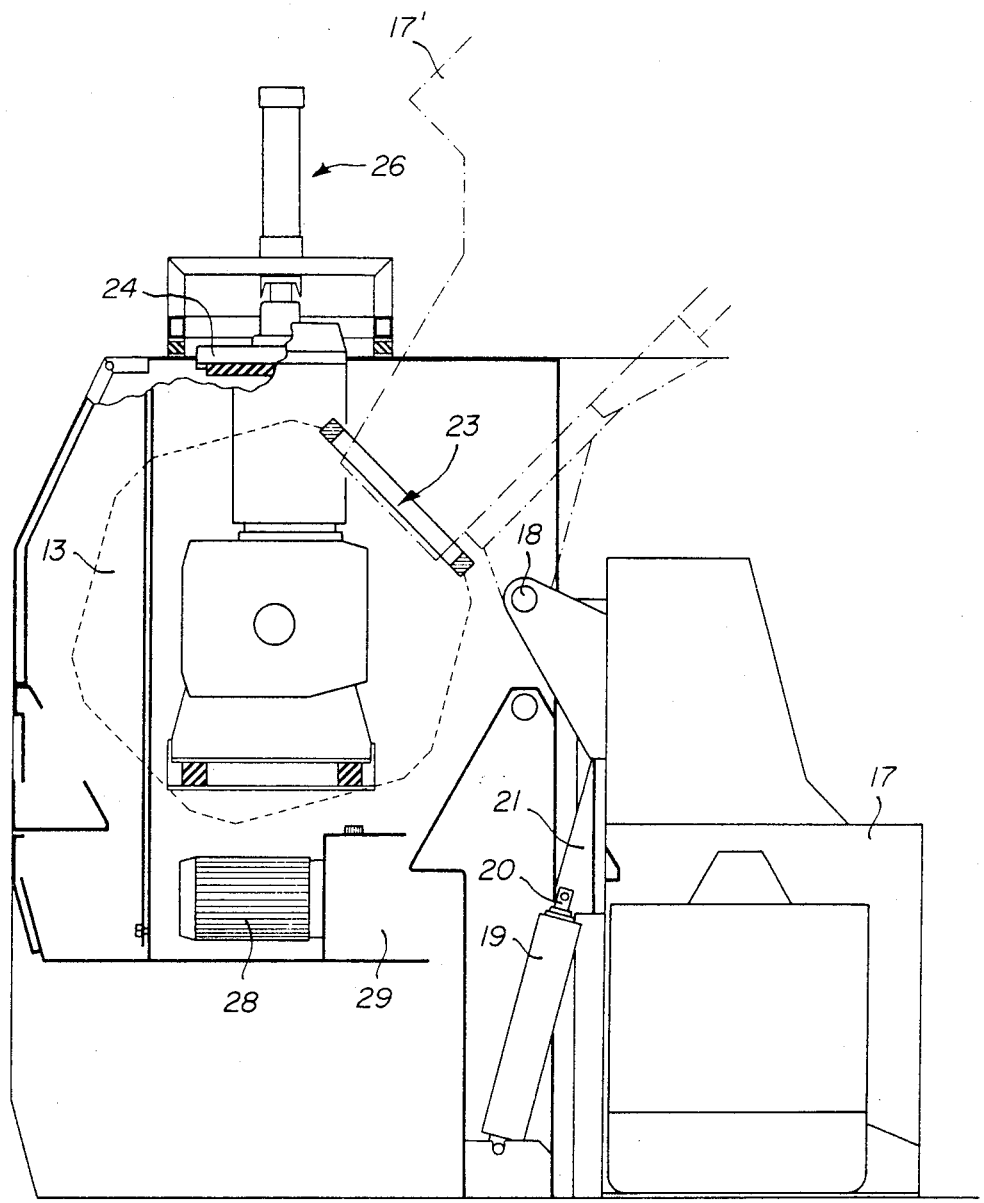
FIG. 1 is a side elevational view of the machine according to the invention.

With reference to the drawings, the machine comprises a framework consisting essentially of two mutually parallel columns or lateral walls 10 and 11 supporting the shaft 12 of rotary drum 13. Said shaft is supported by bearings such as those shown at 14 and is driven by a geared engine 16.

The means for loading the drum 13 essentially comprises a rotating or swinging tub 17 pivotable around an axle 18 to be moved from its lowered position as shown by solid lines into its raised position 17' shown by broken lines. This displacement is effected by means of a hydraulic or pneumatic jack 19, the cylinder of which is connected to the frame of the machine and the piston 20 of which is affixed to a support 21 attached to tub 17.

Between the two lateral walls 10 and 11 of the frame of the machine and beneath drum 13 there is an empty space 22 large enough to allow a receptacle for retrieving treated products to be introduced through the front. Such a receptacle, known in the art, may consist of a drum supported on a pallet or even equipped with casters for automatic displacement.

Figure 2:
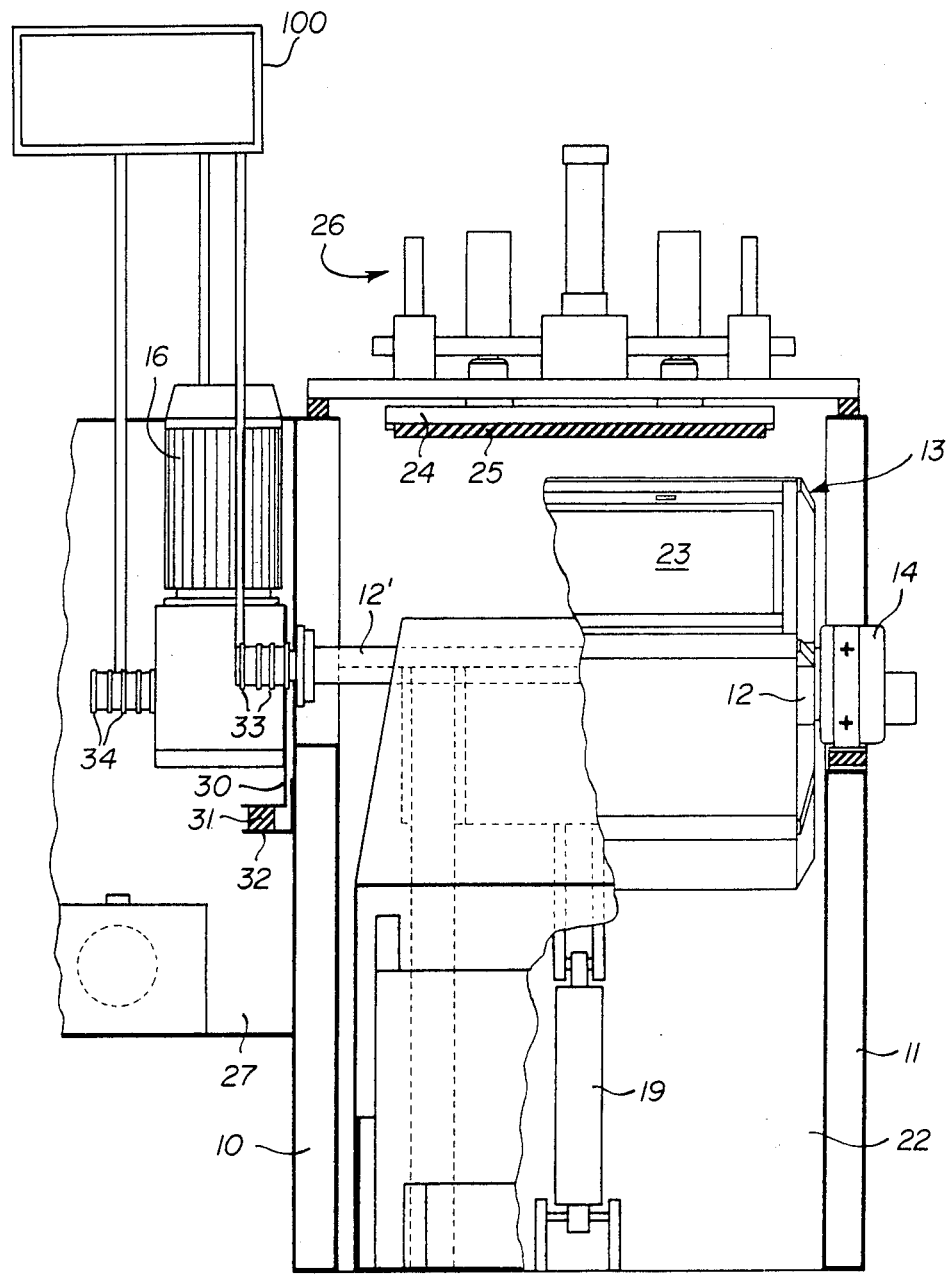
FIG. 2 is a front elevational view of the machine.

As shown in FIGS. 1 and 2, the drum is of hexagonal section and one of its facets comprises an opening 23 with a door 24 which is shown opened away from the drum in FIGS. 1 and 2. This door is equipped with locking means which will be described in greater detail with reference to FIG. 4. It also comprises an interior covering 25 made of vulcanized rubber or appropriate synthetic material carpeting the entire inside of the drum. An automatic locking-unlocking device 26 permits, on the one hand, release of the locking means for door 24, fastening the door, raising it to open drum 13, then, at the end of the loading or unloading operations, replacing the door on the drum and locking the locking means on the door so that the machine is ready for a new treatment cycle.

The machine also has a casing 27 attached to the side of the machine the length of the lateral wall or column 10 of the frame. This casing holds the drive motor 16 and a drive motor 28 for a hydraulic group 29 provided for feeding the hydraulic jack 19 as well as the hydraulic devices on the locking-unlocking means 26 described in greater detail with reference to FIGS. 3 and 4. The drive group consisting of the geared engine 16 is mounted on a support 30 itself supported by shock absorbing blocks 31 connected to a block 32. Two cams 33 and 34, respectively supported by shaft 12' and an axle 12 of the geared engine, furnish detection signals to a programmable control apparatus (100) which controls the automatic progress of the machine's work cycle.

The locking means for door 24 provided with its protective covering 25 comprises two bolts 57 positioned opposite each other and slidable inside a transverse groove disposed within said door. These bolts 57 are axially displaced in opposite directions by a cam 58 connected to a mandrel 59 rotatable around its axle and connected to cam 58 by pins 60. Each of said bolts 57 comprises a transverse slot 61 within which blocking arm 62, pivoting around axle 63, is engageable. One extremity of each of the blocking arms 62 has a projection 64 and a recall spring 65 tending to cause arm 62 to pivot and thereby to engage free extremity 36 of said arm in said slot 61.

The locking-unlocking device consists essentially of a bell-shaped member 37 rotatable on its own axis and surrounding mandrel 59. This bell 37 comprises two L-shaped slots 38 for respectively receiving two transverse projections 39 connected to mandrel 59. Bell 37 is attached by means of a bolt 40 to hydraulic jack 41 held by a support 42 and designed to cause bell 37 to rotate a quarter turn in one or the other direction to ensure coupling of mandrel 59 by means of the cooperation of slots 38 and projections 39. A hydraulic jack 43 allows support 42 to be raised or lowered for raising or replacing door 24. A guide axle 44 connected to the frame guides support 42 during its vertical displacement.

The drum shown in FIG. 5 has a hexagonal profile. It has two exterior walls consisting of soldered reinforced plates 50. The interior surfaces each have a metal plate 51 to support the covering plate 52 made, for example, of vulcanized rubber. The prefabricated plates, easy to replace, are attached by means of cross bolts 53 or by any other similar attachment means.

What is claimed is:

1. A machine for tumbling, deburring and/or polishing bulk products particularly rough molded or manufactured metal pieces, said machine comprising:

a frame supporting a rotatable horizontal drum and a drive mechanism connected to rotate said drum on actuation by automatic controls mean, means for loading product into said drum and means for recovering said product after treatment;

said drum having a lateral opening allowing access by way of a removable door and being provided with means for locking and unlocking said door, said locking and unlocking means comprising a rotatable mandrel connected to a cam which is disposed to control axial displacement of at least two slidable bolts;

said machine further comprising a locking-unlocking device adapted to cooperate with said mandrel for driving the door locking means and to raise the door from the drum for loading product, and for resetting and locking the door on the drum prior to rotation thereof.

2. A machine according to claim 1, wherein the locking-unlocking device comprises a bell-shaped member having at least two L-shaped slots on an interior surface thereof adapted to surround said mandrel, said mandrel having at least two projections arranged to interact with the L-shaped slots on said bell-shape member.

3. A machine according to claim 2, wherein each said bolt comprises at least one traverse slot and the door's locking means comprises a pivoting locking arm urged by a spring to engage in said traverse slots to lock the bolt in position.

4. A machine according to claim 3, wherein said locking arm comprises a projection disposed to cooperate with said L-shaped member to free the bolt.

5. A machine according to claim 4, wherein the drum has a diagonal cross-section and a protective interior covering made of plates, each plate comprising a flat metal layer provided with a covering of flexible material and having means for attaching said metal plate to the surface of the drum.

6. Machine according to claim 1 characterized by the fact that the means for automatically controlling the work cycle comprises cams (33,34) connected to at least one extremity of a shaft driven by the drive mechanism characterized by the fact that the cams furnish detection signals to a programmable control apparatus which controls the automatic start-up of the machine's work cycle.

* * * * *